(12) United States Patent
Min

(10) Patent No.: US 6,522,661 B1
(45) Date of Patent: Feb. 18, 2003

(54) METHOD FOR IMPROVING FAIRNESS IN USE OF NETWORK

(75) Inventor: Kyung Pa Min, Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/299,578

(22) Filed: Apr. 27, 1999

(30) Foreign Application Priority Data

Oct. 21, 1998 (KR) ............................................ 98-44216

(51) Int. Cl.[7] .......................................... H04L 12/413
(52) U.S. Cl. ...................................... 370/445; 370/448
(58) Field of Search ................................. 370/448, 447, 370/445, 908, 910, 230, 278, 282, 444, 443, 455, 461, 462, 229, 446; 340/825.5, 825.51, 825.01

(56) References Cited

U.S. PATENT DOCUMENTS

| | | | |
|---|---|---|---|
| 5,526,355 A | | 6/1996 | Yang et al. ................. 370/85.3 |
| 5,650,997 A | | 7/1997 | Yang et al. .................. 370/448 |
| 5,734,833 A | * | 3/1998 | Chiu et al. .................. 709/225 |
| 5,936,962 A | * | 8/1999 | Haddock et al. ............ 370/446 |
| 5,940,399 A | * | 8/1999 | Weizman ..................... 370/445 |
| 5,978,385 A | * | 11/1999 | Haddock et al. ............ 370/446 |
| 6,172,984 B1 | * | 1/2002 | Beyda .......................... 370/448 |
| 6,205,153 B1 | * | 3/2002 | Shaffer ........................ 370/445 |
| 6,222,850 B1 | * | 4/2002 | Johnson ....................... 370/445 |

\* cited by examiner

Primary Examiner—Douglas Olms
Assistant Examiner—Ricardo M. Pizarro
(74) Attorney, Agent, or Firm—Fleshner & Kim, LLP

(57) ABSTRACT

A method for improving fairness in use of a network includes detecting whether or not collision occurs during packet transmission in a network having a plurality of nodes and successively monitoring X number of times of packet transmission state prior to collision of each node. The method further includes reading monitored value of nodes that have detected collision if collision is detected as a result of collision detection and selecting a value N as a value in the range of $1 \leq N \leq 2^X$ in response to transmission and reception state of each node by determining the read state and then determining backoff time. Standard backoff is performed by adding 1 to the value N if transmission collision occurs again during signal retransmission of each node after backoff time. Updating network state of each node and determining backoff time by reading node state if transmission collision occurs during signal retransmission of each node after backoff time are also performed.

15 Claims, 6 Drawing Sheets

[Table 1]

| number of times of retransmission | r | backoff time(rx slot time) |
|---|---|---|
| 1 | 0,1 | 0x slot time,1x slot time |
| 2 | 0,1,2,3 | ⋮ |
| 3 | 0,1,2,3,4,5,6,7 | ⋮ |
| 4 | 0 — 15 | 0x slot time ~15x slot time |
| ⋮ | ⋮ | ⋮ |
| 10 | 0 — 1023 | 0x slot time ~1023x slot time |

FIGURE 7

METHOD FOR IMPROVING FAIRNESS IN USE OF NETWORK

BACKGROUND OF THE INVENTION

1. Field of the Invention

The present invention relates to local area networks (LANs) of the Ethernet type, and more particularly, to a method for improving fairness in use of a network when collision occurs in an Ethernet LAN.

2. Background of the Related Art

Under Carrier Sense Multiple Access with Collision Detection (CSMA/CD), all nodes on the network have equal priority of access. Any node or station wishing to transmit a packet must first make sure that the channel is clear during inter packet gap (IPG) before beginning to transmit the packet. The IPG is 9.6 $\mu$s on the network of 10M while 0.96 $\mu$s on the network of 100M. However, if a first node that has started transmitting detects a "collision" with a transmission from another node, the first node continues transmitting for a short time to make sure that all nodes wishing to transmit will detect the collision. Every other node detecting the collision also continues to transmit for a short time.

Next, channel access steps of a typical Ethernet LAN will be described with reference to FIG. 1.

As shown in FIG. 1, among m nodes, i.e., a first node S1 to mth node Sm, the first node transmits a first packet, and transmits a second packet after delay by IPG. Thereafter, the first node transmits a third packet after delay by IPG. The mth node transmits a fourth packet after delay by IPG. At this time, since both the first node and the mth node transmit their own packet after transmission of the second packet, collision occurs after ½ of slot time has elapsed.

The nodes involved in the collision wait for the required interpacket delay and then select, and therefore usually different, delay times, referred to as backoff times, before trying transmission of the same packet again.

When a transmission attempt has terminated due to a collision, it is retried by the transmitting node, after a selected backoff time, until either the transmission is successful or a maximum number of attempts have been made and all have terminated due to collisions.

A related art (the IEEE 802.3 standard) defines a collision backoff procedure referred to as "truncated binary exponential backoff."

FIG. 2 shows channel capture when a related art standard backoff algorithm is used.

The backoff time is selected by each node as an integral multiple of the "slot time," which is the maximum round-trip propagation time for the network, i.e., the time to propagate a data packet from one end of the network to the other, and back. The slot time defined by the network of 10M is 51.2 $\mu$s. The number of slot times selected as the backoff time before the nth transmission is chosen as a randomly distributed integer r in the range:

$$0 \leq r < 2^k, k=\min(n, 10)$$

wherein n is the number of times of signal retransmission.

The value r for the number of times (1~n) of signal retransmission is shown in the table 1.

For example, it is assumed that the value n is 1~10. For the first attempted retransmission (i.e., n=1), k=min(1,10)=1 and $0 \leq r < 2^1$. Therefore, r is 0 and 1. At this time, the value r can randomly be selected and the backoff time is selected as 0×slot time or 1×slot time.

For the tenth attempted retransmission, k=min(10,10)=10 and $0 \leq r < 2^{10}$. Therefore, r is 0~1023. At this time, the backoff time is selected as any one of 0×slot time to 1023×slot time if the value r is randomly selected.

The slot time for the network of 10M is 52.4 ms.

The above method can provide fairness in case of a variety of nodes.

Signal transmission in case of a small number of active nodes will be described with reference to FIG. 2.

Suppose there are two active nodes, A and B, in a network and they begin transmitting at approximately the same time, resulting in a first collision. They each select backoff times of 0 or 1 slot time, in accordance with the standard backoff algorithm. At this time, if the values r of the nodes A and B are selected as 0 and 1, respectively, the backoff time of the node A is 0×slot time and the backoff time of the node B is 1×slot time. Therefore, the node A transmits a signal after delay by IPG. The node B will wait a full slot time before making its first retransmission attempt, but by this time node A has started transmitting a second data packet, i.e. node A is transmitting successive packets back-to-back, with only the required IPG separating them. In other words, the node B waits for the IPG+1×slot time, and can transmit a signal after delay by IPG following packet transmission of the node A. Therefore, the node A will be able to successfully transmit on its first attempt at retransmission. Subsequently, if the node A continues to attempt packet transmission, another collision occurs between the nodes A and B. At this time, the node A has successfully transmitted packet, in fact, the node A experiences first collision while the node B experiences second collision. In other words, the number of times n of signal retransmission in the node A is smaller than that in the node B. Therefore, there is small probability that the backoff time of the node A is longer than the backoff time of the node B. In other words, the node A is likely to use the network as compared with the node B. The situation may occur, in which the node A continues to transmit packet data while the node B continues to wait packet data.

As described above, in case of the related art packet transmission, channel capture may occur in the LAN in which the number of active nodes is small.

The aforementioned related art method for using network has several problems.

When the number of nodes operated on the network is small, channel capture effect occurs, in which one node continues to either transmit packet data in a back-to-back transmit mode or wait for the required packet data. This reduces fairness in the use of network.

SUMMARY OF THE INVENTION

Accordingly, the present invention is directed to a method for improving fairness in use of a network, that substantially obviates one or more of the problems due to limitations and disadvantages of the related art.

An object of the present invention is to provide a method for improving fairness in use of a network, which is suitable for improvement of the network throughput by improving fairness in the use of the network when collision occurs during signal transmission in an Ethernet LAN.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for improving fairness in the use of a network, according to the present invention, includes the steps of: detecting whether or not collision occurs during packet transmission in a network having a plurality of nodes; successively monitoring X number of times packet transmission state prior to collision of each node; reading monitored value of nodes that have detected collision if collision is detected as a result of collision detection; selecting a value N as a value in the range of $1 \leq N \leq 2^X$ in response to transmission and reception state of each node by determining the read state and then determining backoff time, retransmitting a signal of each node after the determined backoff time has elapsed; in case of successive reception, i.e., if the value N is selected as a minimum value (N=1), retransmitting a signal of each node after the backoff time has elapsed, and then monitoring and updating signal transmission and reception state of each node if transmission collision does not occur; performing standard backoff by adding 1 to the value N if transmission collision occurs again during signal retransmission of each node after backoff time corresponding to the case that the value N is selected a minimum value has elapsed; updating network state of each node if transmission collision does not occur during signal retransmission of each node after backoff time corresponding to the case that the value N is selected as $1 \leq N \leq 2^X$ greater than the minimum value has elapsed; and determining backoff time by reading node state if transmission collision occurs during signal retransmission of each node after backoff time corresponding to the case that the value N is selected as a value greater than the minimum value has elapsed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, it is intended that fairness in use of a network can be improved by backoff time suitable for a previous network state of each node when collision occurs in a plurality of nodes during packet transmission.

A method for improving fairness in use of a network according to the present invention includes the steps of detecting collision occurrence during packet transmission of each node, reading a network state of a prior node to determine backoff time, determining backoff time by determining a value N with the read data, and retransmitting a signal of each node after delay by the determined backoff time.

The aforementioned method for improving fairness in use of a network according to the present invention will be described by the respective embodiments.

First, the method for improving fairness in use of a network according to the first embodiment of the present invention will be described with reference to FIG. 3, in which packet transmission states of two prior nodes are successively read.

Figure 1:
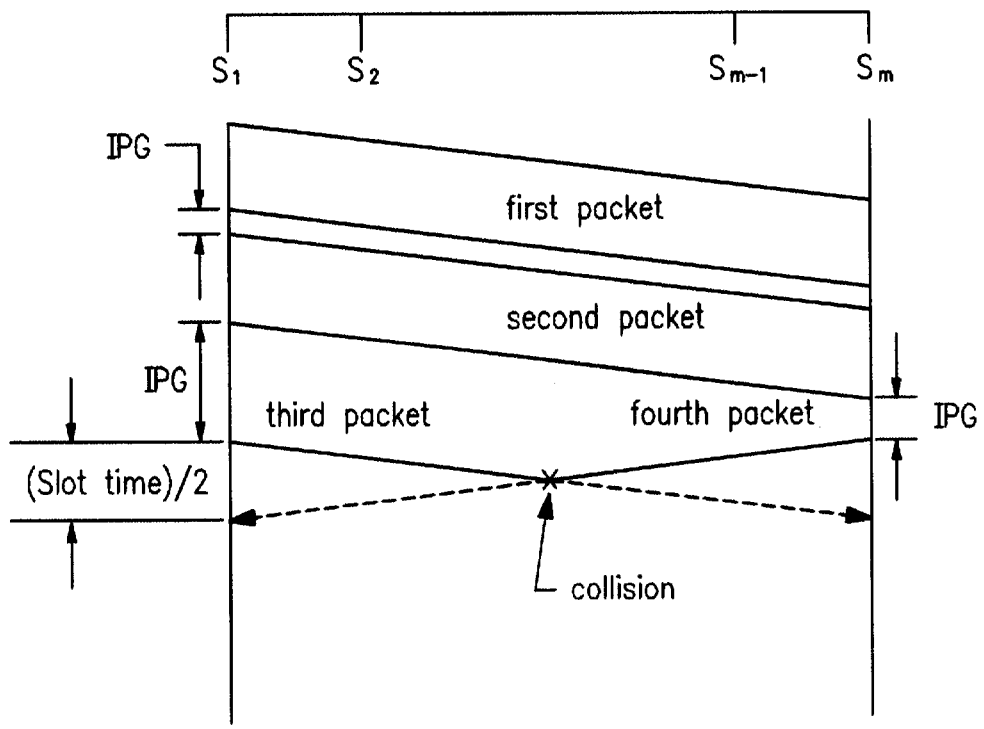
FIG. 1 is a diagram illustrating channel access steps in a typical Ethernet LAN.
Figure 2:
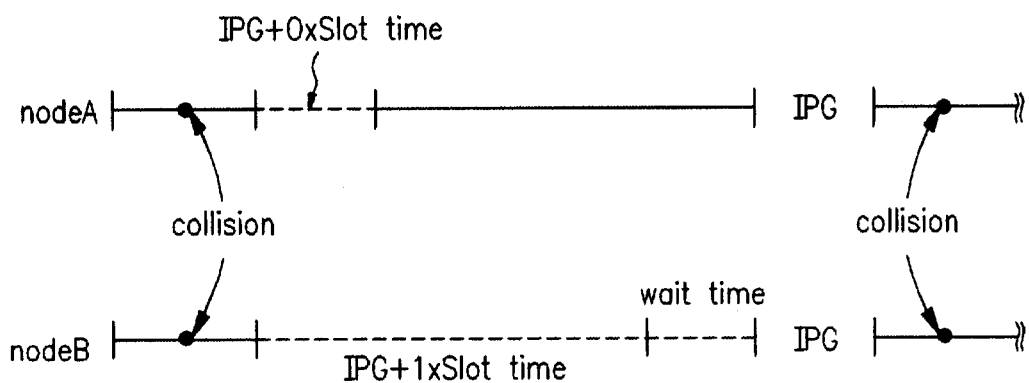
FIG. 2 is a diagram illustrating a channel capture effect when a related art standard backoff algorithm is used.
Figure 3:
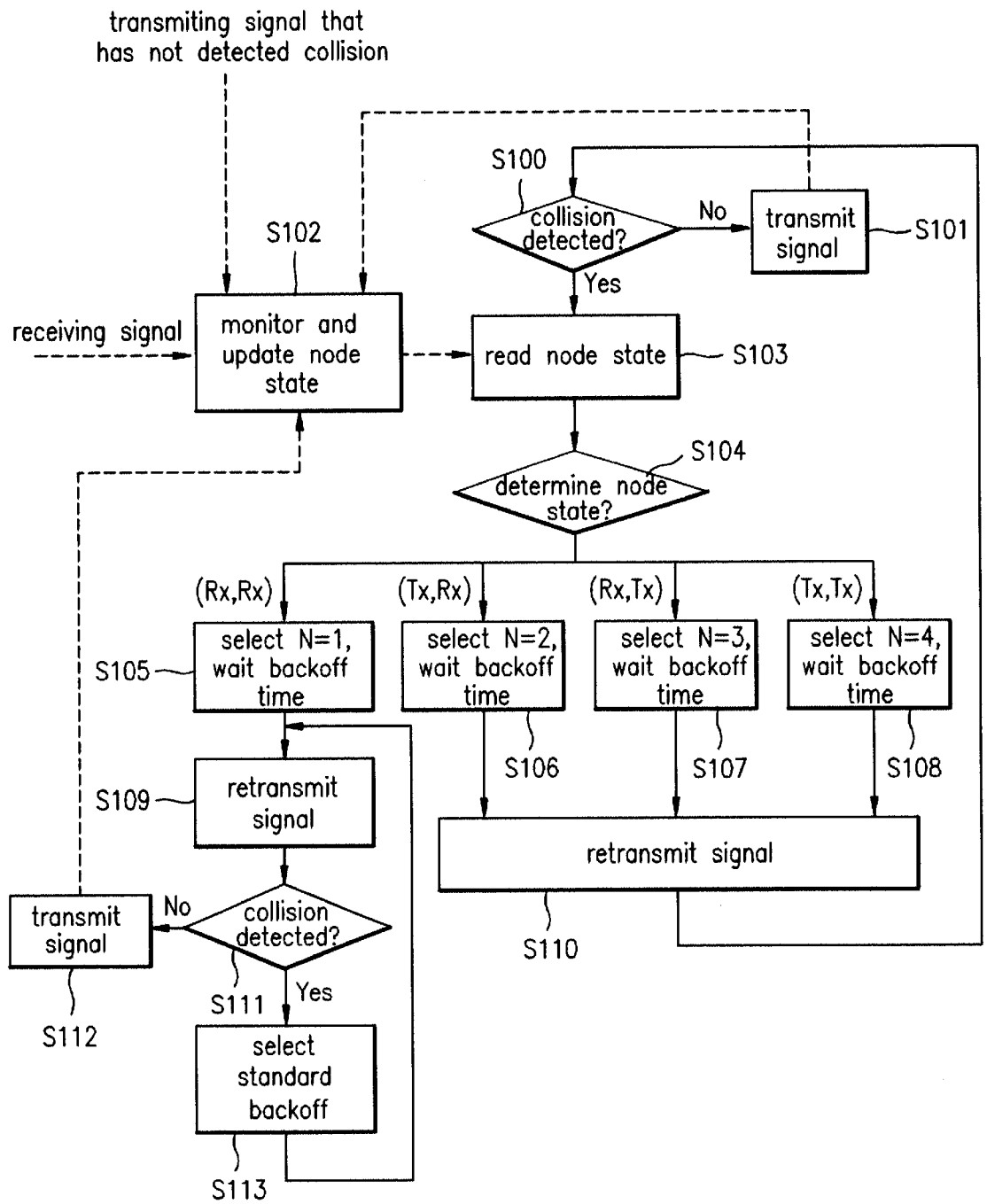
FIG. 3 is a flowchart illustrating a method for improving fairness in the use of network according to the first embodiment of the present invention.

As shown in FIG. 3, it is detected in step S100 whether or not collision occurs during packet transmission of a node. If collision does not occur, a signal is transmitted in step S101 to update node state in step S102. However, if collision occurs, network states of two nodes prior to collision are successively read in step S103. Then, states of two nodes prior to collision are determined in step S104 to determine how the backoff time is reduced.

Subsequently, the value N is selected and the backoff time corresponding to the value N is waited. At this time, the value N is selected as 1 (N=1) if successive reception (Rx, Rx) is only performed in two prior nodes, and the backoff time corresponding to 1 is waited in step S105. Also, the value N is selected as 2 (N=2) if transmission and reception (Tx, Rx) are sequentially performed in two prior nodes, and the backoff time corresponding to 2 is waited in step S106. Still also, the value N is selected as 3 (N=3) if reception and transmission (Rx, Tx) are sequentially performed in two prior nodes, and the backoff time corresponding to 3 is waited in step S107. Further, the value N is selected as 4 (N=4) if successive transmission (Tx, Tx) is only performed in two prior nodes, and the backoff time corresponding to 4 is waited in step S108.

The backoff time depending on the value N is determined by the following equation.

$$0 \leq r < 2^k, k = \min(N, 10)$$

The backoff time depending on the value N is shown in the table 1 of FIG. 7. At this time, the integer r may randomly be selected.

As aforementioned, in case of reception only, the backoff wait time is short to increase transmission probability. On the other hand, in case of transmission only, the backoff wait time is long to reduce transmission probability.

If the value N is selected as 1, signal retransmission is performed in step S109 after the backoff time corresponding to N=1 has elapsed. It is then detected in step S111 whether or not collision occurs during packet transmission. If transmission collision does not occur as a result of detection, signal transmission is performed in step S112 to update node state in step S102. If transmission collision occurs again as a result of detection, standard backoff method is selected in step S113. The standard backoff method means that the backoff time corresponding to a value obtained by adding 1 to a prior selected value N is waited. Signal retransmission is again performed after selecting the standard backoff method. The above steps repeat until the signal is transmitted.

Meanwhile, if the value N is selected as N=2, N=3 or N=4, the backoff time corresponding to each of the value N is waited and then signal retransmission is performed in step S110. In this case, it is also detected in step S100 whether or not transmission collision occurs. If transmission collision does not occur, signal transmission is performed in step S101 to update node state in step S102. If transmission collision occurs, node state is read in step S103 and determined in step S104 so that the value N is selected. Thereafter, the backoff time corresponding to the value N is waited and then signal retransmission is performed. The above steps repeat as well.

The method for improving fairness in use of a network by applying the first embodiment of the present invention will be described with reference to FIG. 4.

Figure 4:
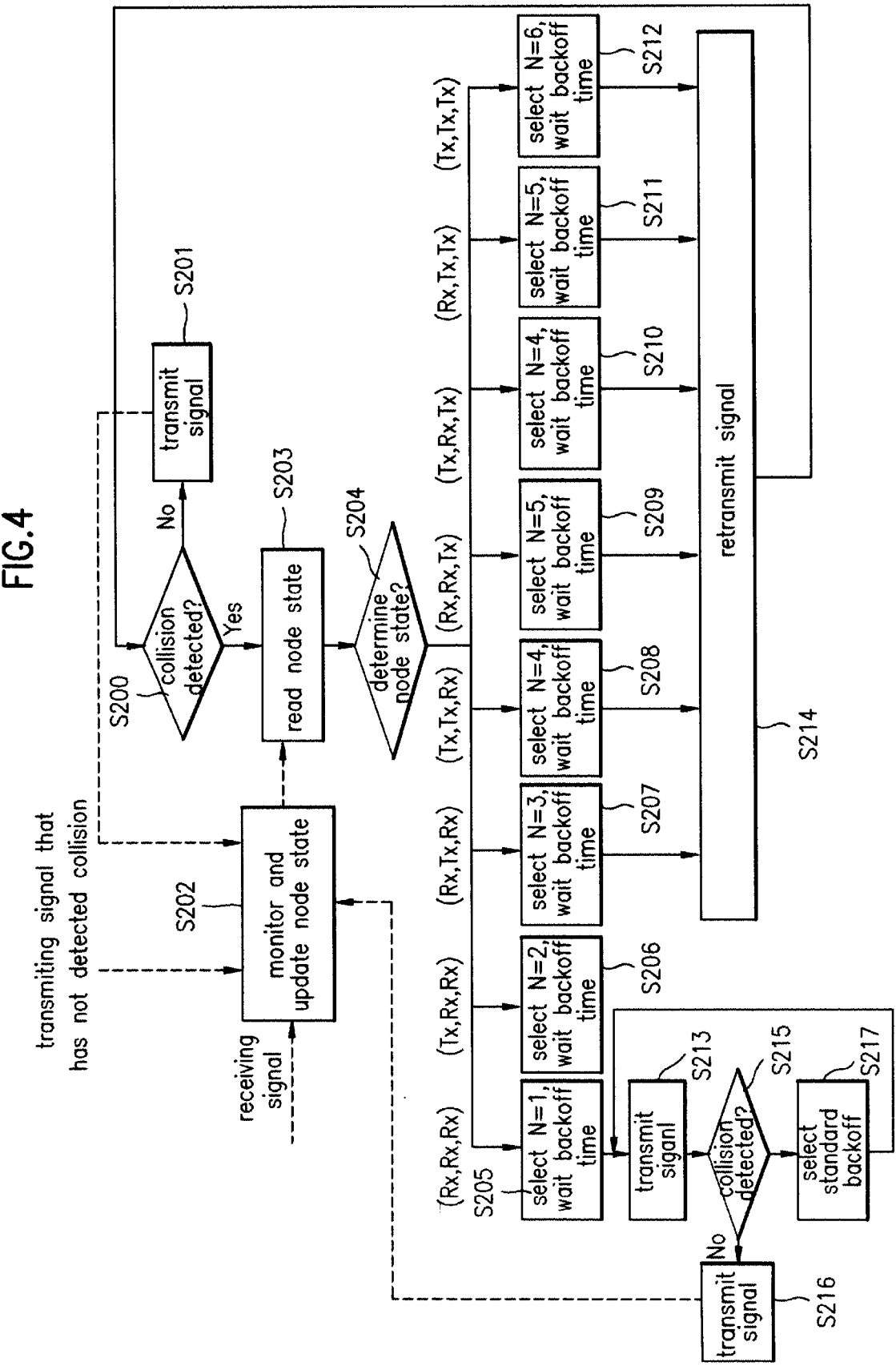
FIG. 4 is a flowchart illustrating a method for improving fairness in the use of network by applying the first embodiment of the present invention.

In FIG. 4, packet.transmission states in three nodes prior to collision are successively-read to improve fairness of the network which transmits a signal.

As shown in FIG. 4, the step S200 of detecting transmission collision, the step S201 of transmitting a signal if transmission collision does not occur, the step S202 of updating node state, the step S203 of reading the node state if transmission collision occurs, and the step S204 of determining node state to determine backoff time are performed in the same manner as the first embodiment of the present invention, shown in FIG. 3.

FIG. 4 is different from FIG. 3 in that the value N increases as much as $2^3$ by successively storing and reading states of three nodes prior to collision.

In other words, the value N is selected as 1 when states of three prior nodes are (Rx, Rx, Rx), the value N is selected as 2 when states of three prior nodes are (Tx, Rx, Rx), the value N is selected as 3 when states of three prior nodes are (Rx, Tx, Rx), the value N is selected as 4 when states of three prior nodes are (Tx, Tx, Rx), the value N is selected as 5 when states of three prior nodes are (Rx, Rx, Tx), the value N is selected as 6 when states of three prior nodes are (Tx, Rx, Tx), the value N is selected as 7 when states of three prior nodes are (Rx, Tx, Tx), and the value N is selected as 8 when states of three prior nodes are (Tx, Tx, Tx). The backoff time corresponding to each of the value N is then waited in steps S205, S206, S207, S208, S209, S210, S211, and S212. Subsequently, signal retransmission is performed in step S214.

If the value N is selected as 1, signal retransmission is performed in step S213 after the backoff time corresponding to N=1 has elapsed. Thereafter, it is detected in step S215 whether or not collision occurs during packet transmission. If transmission collision does not occur as a result of detection, signal transmission is performed in step S216 to monitor and update node state in step S202. If transmission collision occurs again as a result of detection, standard backoff method is selected in step S217. The standard backoff method means that the backoff time corresponding to a value obtained by adding 1 to a prior selected value N is waited. Signal retransmission is again performed after selecting the standard backoff method. The above steps repeat until the signal is transmitted.

Meanwhile, if the value N is selected as any one of 2 to 8, the backoff time corresponding to each of the value N is waited and then signal retransmission S214 is performed. In this case, it is also detected in step S200 whether or not transmission collision occurs. If transmission collision does not occur, signal transmission is performed in step S201 to monitor and update node state in step S202. If transmission collision occurs, node state is read in step S203 and determined in step S204 so that the value N is selected. Thereafter, the backoff time corresponding to the value N is waited and then signal retransmission is performed. The above steps repeat as well.

A method for improving fairness in the use of network according to the second embodiment of the present invention will be described with reference to FIGS. 5 and 6, in which packet transmission states of two nodes prior to collision are successively read.

Figure 5:
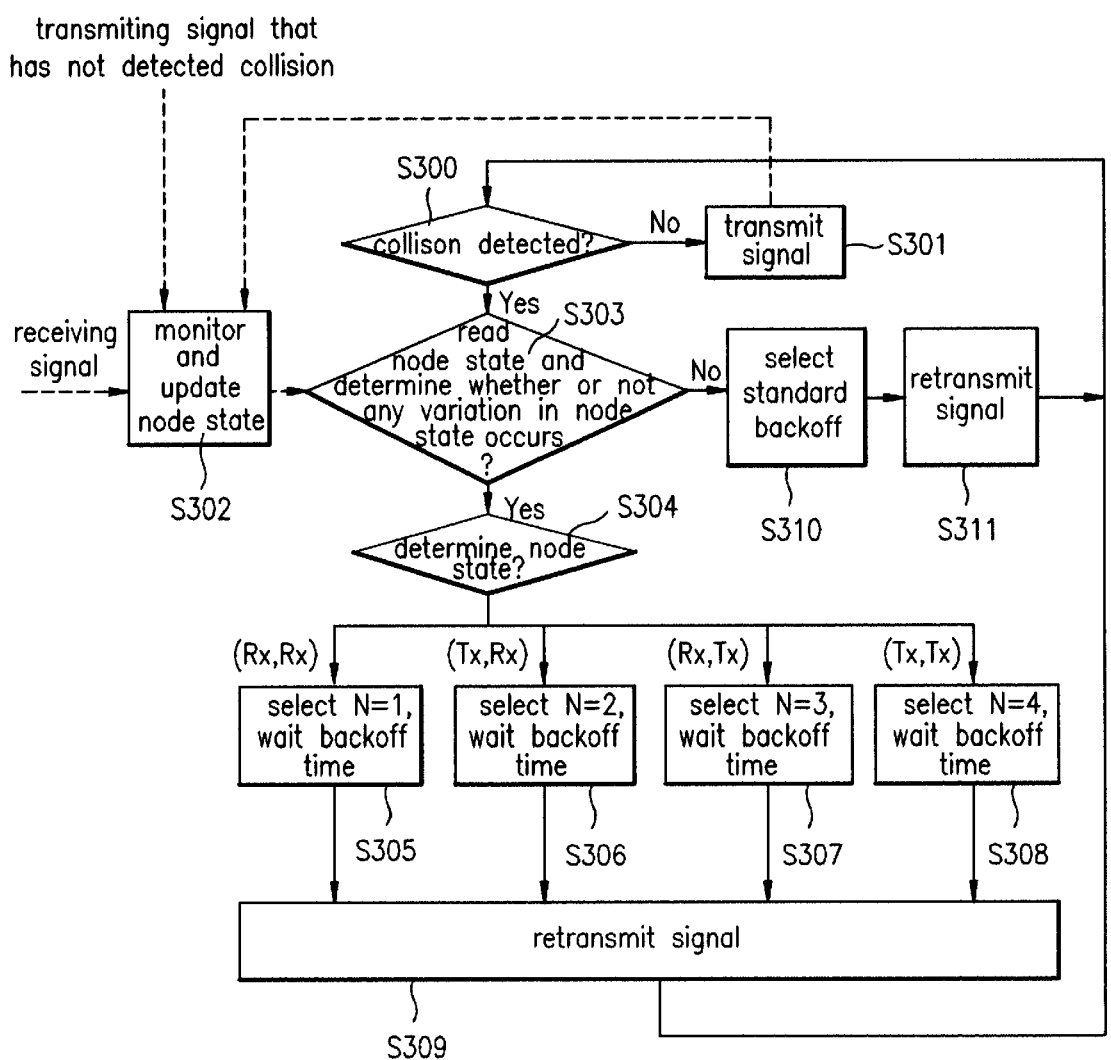
FIG. 5 is a flowchart illustrating a method for improving fairness in the use of network according to the second embodiment of the present invention.

As shown in FIG. 5, it is detected in step S300 whether or not collision occurs during packet transmission. If collision does not occur, signal transmission is performed in step S301 and node state is monitored and updated in step S302.

However, if collision occurs, network states of two nodes prior to collision are successively read. It is then determined in step S303 whether or not the state of the collided node is equal to the state prior to collision. The state of the read node is determined in step S304 to determine the backoff time.

Thereafter, the value N is selected and the backoff time corresponding to the selected value N is waited.

If successive reception (Rx, Rx) is only performed in two prior nodes, the value N is selected as 1 (N=1), and the backoff time corresponding to the selected value N is waited in step S305. If transmission and reception (Tx, Rx) are sequentially performed in two prior nodes, the value N is selected as 2 (N=2), and the backoff time corresponding to the selected value is waited in step S306. If reception and transmission (Rx, Tx) are sequentially performed in two prior nodes, the value N is selected as 3 (N=3), and the backoff time corresponding to the selected value is waited in step S307. If successive transmission (Tx, Tx) is only performed in two prior nodes, the value N is selected as 4 (N=4), and the backoff time corresponding to the selected value is waited in step S308.

The backoff time depending on the value N is determined as follows:

$$0 \leq r < 2^k, k=\min(N, 10)$$

The backoff time depending on the value N is determined by randomly selecting the value r corresponding to the value N, as shown in the table 1 of FIG. 7.

As aforementioned, in case of reception only, the backoff wait time is short to increase transmission probability. On the other hand, in case of transmission only, the backoff wait time is long to reduce transmission probability.

Subsequently, signal retransmission is performed in step S309 after the backoff time has elapsed. It is also detected in step S301 whether or not transmission collision occurs. If collision does not occur as a result of detection, signal transmission is performed in step S301 to monitor and update node state in an active node in step S302.

However, if transmission collision occurs as a result of detection, the node state is again read to compare with a prior node so that it is determined whether or not the node state is varied in step S303. If the node state is not varied, the backoff time is again determined by selecting the standard backoff method in step S310. Signal retransmission is performed in step S311 if the backoff time has elapsed. Thereafter, the step S300 repeats.

The method for improving fairness in use of a network by applying the second embodiment of the present invention will be described with reference to FIG. 6.

Figure 6:
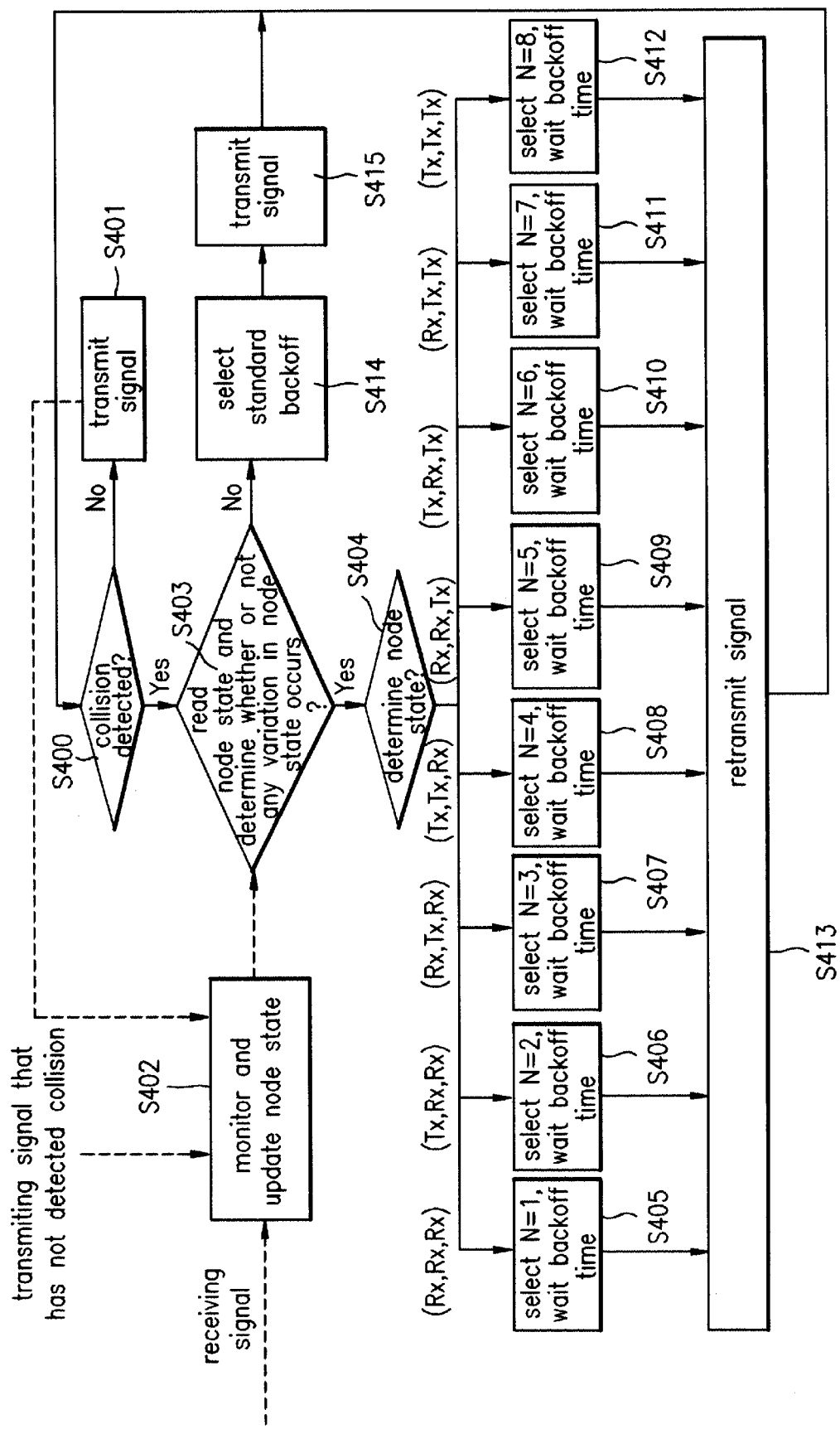
FIG. 6 is a flowchart illustrating a method for improving fairness in the use of network by applying the second embodiment of the present invention.

As shown in FIG. 6, it is detected in step S400 whether or not transmission collision occurs. If transmission collision does not occur as a result of detection, signal transmission is performed in step S401 to monitor and update node state in step S402. If transmission collision occurs as a result of detection, node state is read to compare with a prior node state so that it is determined in step S403 whether or not the node state has been varied. If the node state has not been varied, the standard backoff method is selected in step S414 to determine again the backoff time. If the backoff time has elapsed, signal retransmission is performed in step S415. Also, if the node state has been varied, the read node state is determined in step S404. These steps are the same as the steps of FIG. 5.

FIG. 6 is different from FIG. 5 in that the value N increases as much as $2^3$ by successively storing states three nodes prior to collision.

In other words, the value N is selected as 1 when states of three prior nodes are (Rx, Rx, Rx), the value N is selected as 2 when states of three prior nodes are (Tx, Rx, Rx), the value N is selected as 3 when states of three prior nodes are (Rx, Tx, Rx), the value N is selected as 4 when states of three prior nodes are (Tx, Tx, Rx), the value N is selected as 5 when states of three prior nodes are (Rx, Rx, Tx), the value N is selected as 6 when states of three prior nodes are (Tx, Rx, Tx), the value N is selected as 7 when states of three prior nodes are (Rx, Tx, Tx), and the value N is selected as 8 when states of three prior nodes are (Tx, Tx, Tx). The backoff time corresponding to each of the value N is then waited in steps S405, S406, S407, S408, S409, S410, S411, and S412. Signal retransmission is performed in step S413.

The method for improving fairness in the use of network according to the present invention has the following advantages.

If the number of active nodes is small in a small network, it is possible to reduce channel capture effect by properly adjusting the backoff time. Therefore, fairness in use of the network can be improved.

It will be apparent to those skilled in the art that various modifications and variations can be made in the method for improving fairness in use of the network according to the present invention without departing from the spirit or scope of the invention. Thus, it is intended that the present invention covers the modifications and variations of the invention provided they come within the scope of the appended claims and their equivalents.

What is claimed is:

1. A method for improving fairness in use of a network, comprising:

detecting whether or not collision occurs during packet transmission in the network having a plurality of nodes;
   successively monitoring X number of times of packet transmission state prior to collision of each node;
   reading monitored packet transmission state value of nodes where collision is detected as a result of collision detection;
   selecting a value N as a value in the range of $1 \leq N \leq 2^X$ in response to transmission and reception state of each node by determining the read monitored state value and then determining backoff time;
   retransmitting a signal of each node after the determined backoff time has elapsed;
   if the value N is selected as a minimum value and in case of successive reception, retransmitting a signal of each node after the backoff time has elapsed, and then monitoring and updating signal transmission and reception state of each node if transmission collision does not occur;
   performing standard backoff by adding 1 to the value N if transmission collision occurs again during signal retransmission of each node after backoff time corresponding to the case that the value N is selected as the minimum value has elapsed;
   updating network state of each node if transmission collision does not occur during signal retransmission of each node after backoff time corresponding to the case that the value N is selected as $1 \leq N \leq 2^X$ greater than the minimum value has elapsed; and
   determining backoff time by reading the node state if transmission collision occurs during signal retransmission of each node after backoff time corresponding to the case that the value N is selected as a value greater than the minimum value has elapsed.

2. The method as claimed in claim 1, wherein selecting the value N as 1 if successive reception is performed in X number of previous nodes while the value N is selected as $2^X$ if successive transmission is performed in X number of previous nodes.

3. The method as claimed in claim 1, wherein the backoff time is determined by producing a value r using an equation of $1 \leq r \leq 2^k$, K=min(N, 10), if the value N is selected, selecting any one of the produced value r, and multiplying the selected r by slot time.

4. The method as claimed in claim 3, wherein the slot time is a maximum time that takes to receive a response after packet transmission from one node to another node, and depends on the size of the network.

5. A method for improving fairness in use of a network, comprising:

detecting whether or not collision occurs during packet transmission in the network having a plurality of nodes;
   monitoring X number of times of packet transmission state of each node;
   reading packet transmission state of each node monitored if collision is detected, and determining whether or not any variation in a prior packet transmission state of collided node occurs;
   selecting a value N as a value in the range of $1 \leq N \leq 2^X$ in response to the read node state if any variation occurs, and then determining backoff time;
   retransmitting signals of each node after the determined backoff time has elapsed;
   detecting transmission collision of the retransmitted node;
   performing standard backoff by adding 1 to the value N if transmission collision occurs during signal retransmission of each node after the determined backoff time has elapsed, and then retransmitting the signals; and
   updating signal transmission and reception state of each node if transmission collision does not occur during signal retransmission of each node after the determined backoff time has elapsed.

6. The method as claimed in claim 1, wherein selecting the value N as 1 if successive reception is performed in X number of previous nodes while the value N is selected as $2^X$ if successive transmission is performed in X number of previous nodes.

7. The method as claimed in claim 1, wherein the backoff time is determined by producing a value r using an equation of $1 \leq r \leq 2^k$, K=min(N, 10), if the value N is selected, selecting any one of the produced value r, and multiplying the selected r by slot time.

8. The method as claimed in claim 7, wherein the slot time is a maximum time that takes to receive a response after packet transmission from one node to another node, and depends on the size of the network.

9. A method for improving network accessability, comprising:

detecting whether or not collision occurs during packet transmission in a network having a plurality of nodes;

monitoring X number of times of packet transmission state of each node;

selecting a value N in the range of $1 \leq N \leq 2^X$ for determining backoff time when collision is detected;

retransmitting signals of each node after the determined backoff time has elapsed;

detecting transmission collision of the retransmitted node;

performing standard backoff if collision occurs during the signal retransmission, then retransmitting the signals; and updating signal transmission and reception state of each node if collision does not occur during signal retransmission of each node.

10. The method as claimed in claim 9, further comprising:

reading monitored packet transmission state value of each node where collision is detected as a result of collision detection for determining backoff time; and retransmitting a signal of each node after the backoff time has elapsed, and then monitoring and updating signal transmission and reception state of each node if collision does not occur again.

11. The method as claimed in claim 9, wherein the standard backoff is adding 1 to the value N.

12. The method as claimed in claim 9, wherein the value N is selected as a minimum value in case of successive reception.

13. The method as claimed in claim 12, wherein the value N is selected as 1.

14. The method as claimed in claim 9, wherein the value N is selected as a maximum value in case of successive transmission.

15. The method as claimed in claim 14, wherein the value N is selected as 10.

* * * * *